No. 823,712. PATENTED JUNE 19, 1906.
B. UHLMANN.
ADJUSTABLE PEDAL CRANK FOR BICYCLES.
APPLICATION FILED NOV. 9, 1905.

3 SHEETS—SHEET 2.

Witnesses
Estelle V. Wale.
S. Herzog

Inventor
Bernhard Uhlmann
By his Attorney
Max D. Ordmann

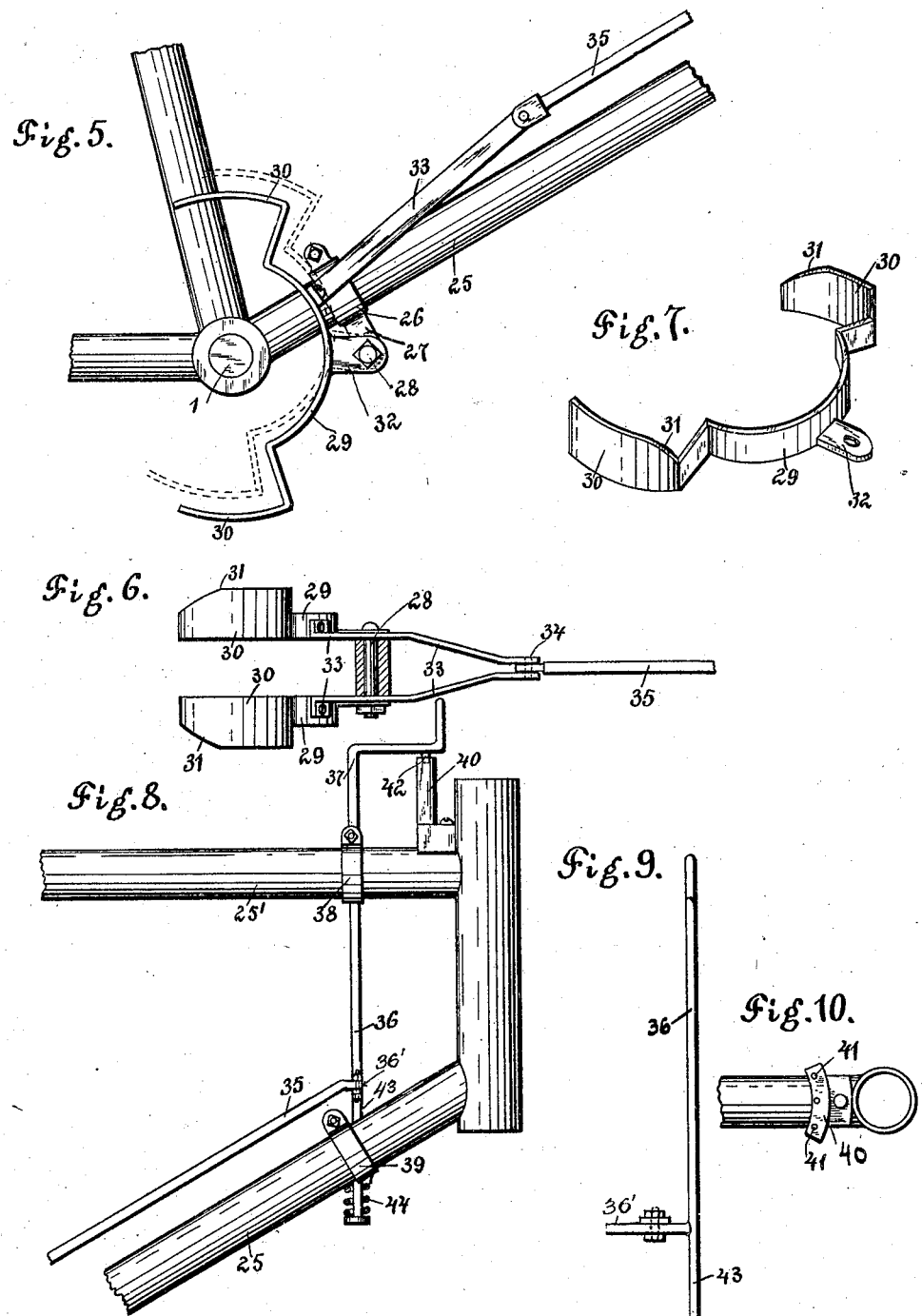

UNITED STATES PATENT OFFICE.

BERNHARD UHLMANN, OF PASSAIC, NEW JERSEY.

ADJUSTABLE PEDAL-CRANK FOR BICYCLES.

No. 823,712.  Specification of Letters Patent.  Patented June 19, 1906.

Application filed November 9, 1905. Serial No. 286,593.

*To all whom it may concern:*

Be it known that I, BERNHARD UHLMANN, a subject of the German Emperor, residing at Passaic, in the county of Passaic and State of New Jersey, have invented certain new and useful Improvements in Adjustable Pedal-Cranks for Bicycles, of which the following is a specification.

The present invention pertains to improvements in bicycles, and most particularly to the pedal arrangement thereof, and has for its object to provide for a crank having a variable throw, so as to allow the rider of driving the wheel more easily when ascending a hill or elevation. To accomplish this object, I arrange an adjustable crank and provide means whereby the adjustment will be automatically effected upon turning a hand-lever in one or the other direction.

To make my invention more clear, the same is illustrated in the accompanying drawings, in which similar references denote corresponding parts, and in which—

Figure 1:
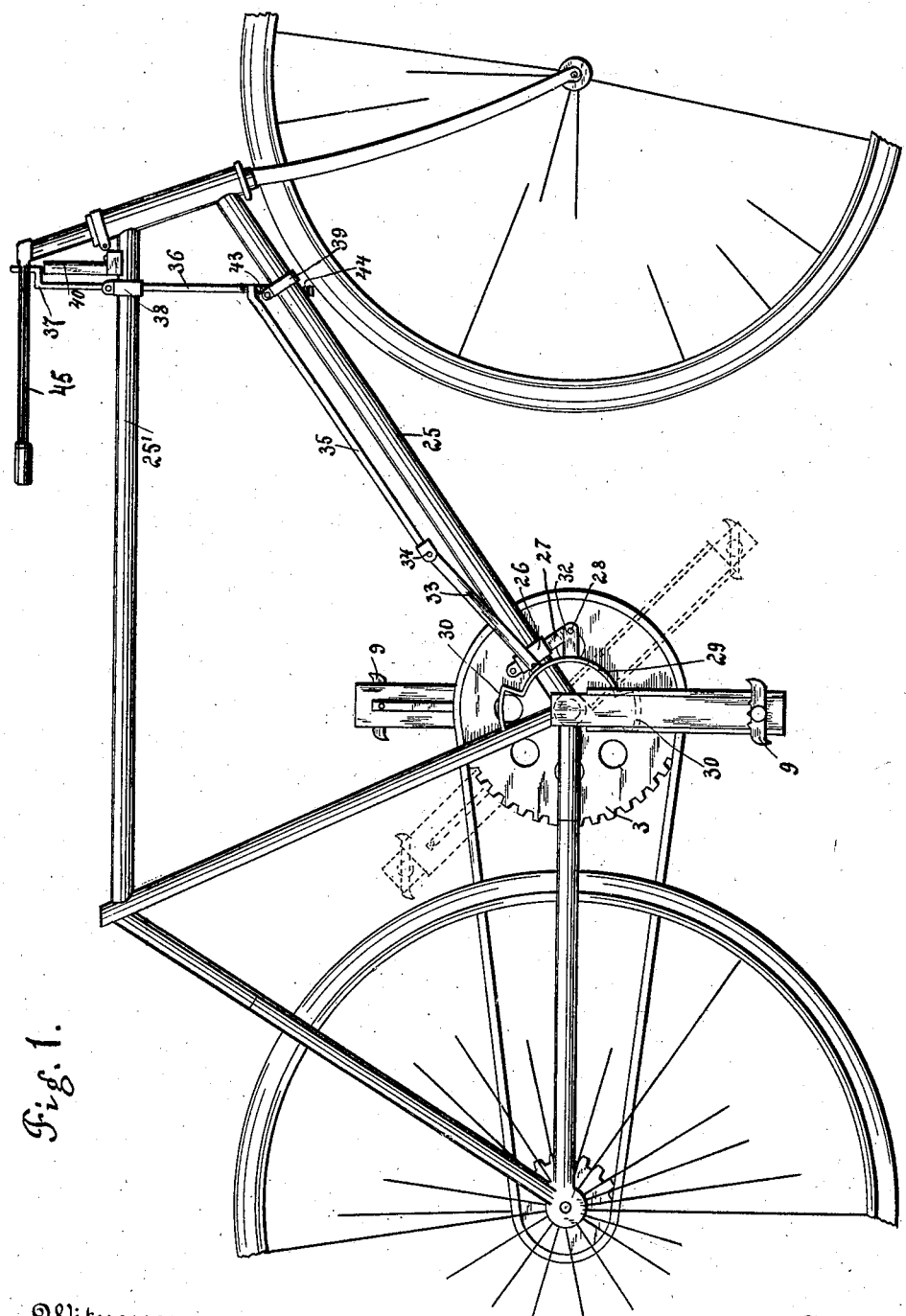
Figure 2:
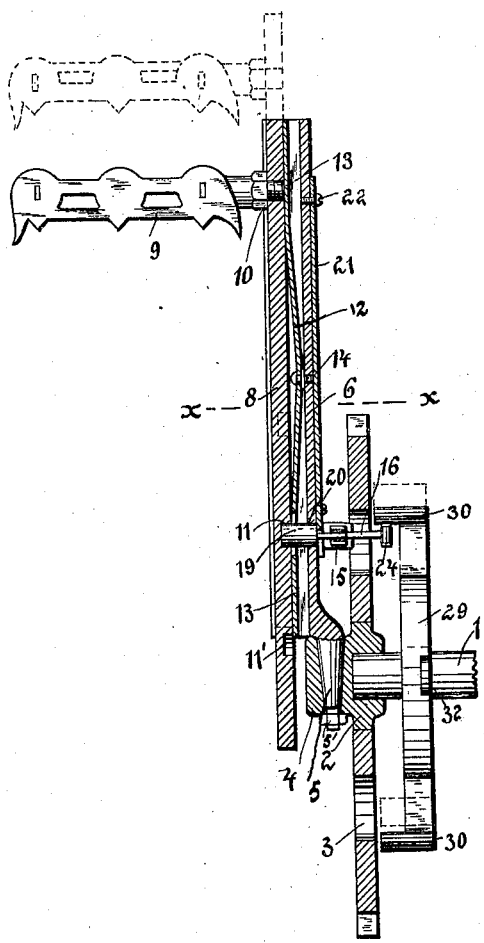
Figure 3:
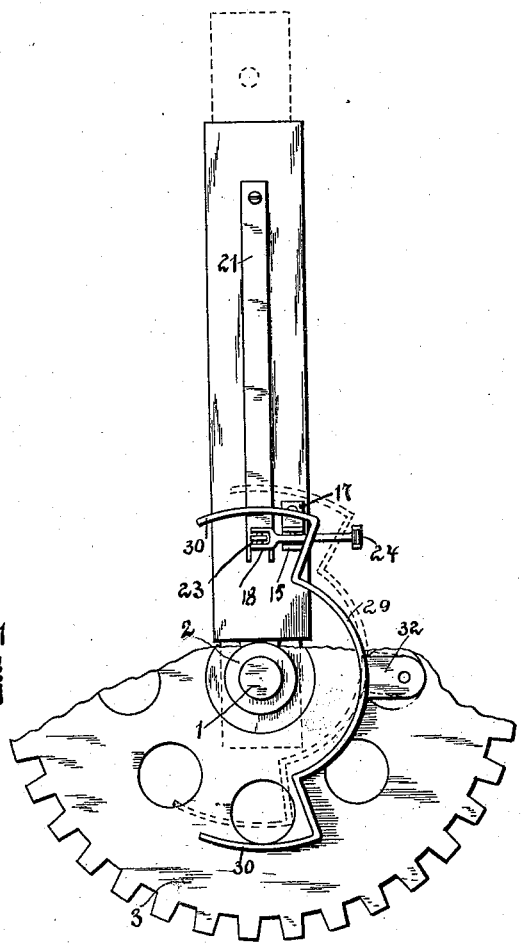
Figure 4:
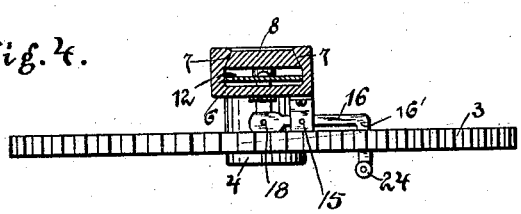

Figure 1 is a front elevation of a bicycle embodying my invention. Fig. 2 is a sectional side view of the pedal and adjustable crank. Fig. 3 is a rear view thereof. Fig. 4 is a cross-section on line $x\ x$ of Fig. 2. Fig. 5 is a front elevation of a lock-releasing device. Fig. 6 is a top view thereof. Fig. 7 is a perspective view of a detail part of said releasing device. Fig. 8 is an elevational view of the lever mechanism for the adjustment of the releasing device, and Figs. 9 and 10 are details of said lever mechanism.

With reference to the drawings, 1 is the crank-shaft of the bicycle, which carries at one of its outer ends a disk 2, Figs. 2, 3. Firmly secured upon the circumference of the said disk is the sprocket-wheel 3 for the transmission of the rotation movement of the pedal-crank to the rear wheel of the bicycle. Projecting from the face-surface of the disk 2 is a socket 4, serving for the attachment of the pedal-crank, as will be hereinafter fully specified.

The adjustable crank consists of an outer frame 6, which at both its sides is provided with longitudinal flanges 7 7, in which guideways for an inner piece 8 are formed. This inner piece forms the crank proper and has firmly secured to one of its ends the pedal 9 by a bolt 10 or the like.

At one end the frame 6 is provided with a conical nose or projection 5, which is adapted to fit in a corresponding bore of the socket 4. By means of a nut 5', screwing on the threaded end of the projection 5, the frame is securedly fixed to the shaft 1.

The crank proper, 8, is capable of sliding in the guideways of the flange 7 7 of the frame 6 and has two or more notches 11 11' arranged at certain intervals from each other in longitudinal direction, which, as will be hereinafter more fully specified, serve for the adjustment of the crank proper for various throws. A plate-spring 12, secured by a screw-bolt 14 at its center to the inner surface of the frame 6 and curved at its extremities 13 13 to press against the sliding part of the crank, serves to insure a perfect bearing of the latter in the guideways and lessen the friction between the sliding crank and the frame.

At the outer surface of the frame 6 a lock mechanism is arranged. This lock mechanism consists of a lever 16, pivoted at 15 in a projection 17, secured to the frame 6. One end of the angular lever is bifurcated, as at 18, and has a bolt 19 hinged thereto and adapted to slide in a bore 20, cut through the frame 6. A plate-spring 21, secured at 22 to the rear surface of the frame 6, is adapted to press at 23 against the outer surface of the bolt 19, so as to normally hold the latter in contact with the sliding part 8 and force it into engagement with one of the notches 11, that as the inner part 8 slides in the frame 6 comes to register with the bore 20. The opposite end 16' of the lever 16 is bent and carries a movable roller 24, as shown in the drawings. Normally the notch 11 of the sliding part 8 will register with the bore 20 of the frame 21, so that the locking-bolt 19 at the inner end of the lever 16 will engage the notch 11 and will be held in engagement therewith by the plate-spring 21. In this position the crank 5 has the normal length and will be used when the rider travels on a plain surface.

When the rider approaches a hill or an elevation, it will be necessary in order to render the ascension easier to change the throw of the crank—in other words, to lengthen the same. This is accomplished by disengaging the bolt or pin 19 from the notch 11, and thus releasing the sliding crank 8, which will automatically move outward within the frame 6 as the latter revolves around the crank-shaft 1. The bolt being in the meantime released, so as to be pressed by spring 21 into contact with the sliding crank 8, will instantaneously engage the next notch 11' of the crank and lock the latter in its extended position. The part 8 is somewhat longer than the frame 6, in which it slides, and may be provided with suitable means to prevent the slide from falling out from frame 6 during its rotation and sliding movement.

The mechanism for the automatical operation of the lock mechanism is as follows: Suitably secured to the tube 25 of the bicycle-frame is a sleeve 26, Figs. 1, 5, which is provided with a downward projection 27. The latter serves as a bearing for a short shaft or pivot 28, upon the extremities of which are firmly secured two peculiarly-shaped metal strips 29, one for each pedal and crank, which, according to their position to the crank-shaft, I will call "eccentrics." The inner edges 31 of the ends 30 of these eccentrics 29 are cam-shaped, Fig. 6, so that when in contact with the roller 24 of the lever 16 the same will operate the latter by depressing it and causing its bolt or pin 19 to disengage from notch 11 or 11' of the crank 8. Each eccentric is provided with a projection or ear 32, Fig. 2, by means of which it is loosely borne upon the shaft or pivot 28, so as to be capable of swinging thereon. Each of the eccentrics has a bar 33 attached to it, which projects forward toward the front wheel. The forward ends of the said bars are bent toward each other and are provided with bores to receive a bolt or pivot 34. Hinged to the latter is a connecting-rod 35, extending forward and upward, Figs. 1 and 5. The upper or forward end of the rod 35 is attached to a crank-arm 36' of a rod 36, arranged adjacent to the steering-tube 37 and extending vertically downward. The rod 36 may be movably guided in sleeves 38 39, secured to the tubes 25 25' of the bicycle-frame.

The upper end of the rod 36 is formed to a handle 37, Figs. 1, 8, which by means of a nose or tooth 42 may normally engage one of the notches 41, arranged in a base 40, which may be secured to the bicycle-frame below the steering-handle 45. The lower end 43 of the rod 36 may be attached to a spring 44, secured to the sleeve 39, which spring will tend to draw the rod 36 downward, whereby the nose 42 is held in engagement with one of the notches 41 in the base 40.

The mode of operation of my adjustable crank is as follows: Normally the position of the eccentrics will be such that the bent end 16' of the lever 16 of the lock mechanism will have a free path during the rotation of the crank and the sliding part 8 of the latter will be locked in its frame 6 by the pin or bolt 19 of the lock mechanism. When it is desired to change the throw of the crank, the handle 37 is turned to the right or left from its central or normal position. This causes the crank-arm 36' of the rod 36 to pull the connecting-rod 35 forward, whereby the eccentrics 29 are swung around the shaft 28, bringing either their upper or lower cam-shaped edges 31 into the path of the rollers 24 of the levers 16. As the crank continues its rotation the levers 16 will come in contact with the said cam-shaped edges and will be depressed, whereby the bolts or pins 19 will be disengaged from the notches 11 of the slides 8 of the respective cranks and release the latter in the aforesaid manner. During a further rotation of the crank the sliding part 8 will move outward within the frame 6 until the pin 19 will engage the notch 11' and lock the crank in extended position.

I do not wish, however, to restrict myself to the details of construction specified and shown, since various modifications may be made by those skilled in the art without departing from the spirit of my invention.

What I claim, and desire to secure by Letters Patent, is—

1. The combination with a cycle-wheel, of adjustable pedal-cranks to permit various throws thereof, a lock mechanism for each crank to lock the latter in various positions, means for automatically releasing said locks and means to allow a manual adjustment of the releasing device, substantially and for the purpose as specified.

2. The combination with a cycle-wheel, of an adjustable pedal-crank, comprising an outer frame, a sliding part guided therein and forming the crank proper, said movable part carrying the pedal, notches in said movable part, an angular lever attached to the frame of the crank, a lock bolt or pin at one end of said lever, a transversal bore in the frame, the bolt being guided in said bore and adapted to engage one of the notches of the sliding crank and lock the latter, a device for automatically releasing the locking-bolt and means to allow a manual adjustment of the releasing device, substantially and for the purpose as specified.

3. The combination with a cycle-wheel, of adjustable cranks for the pedals, each comprising an outer frame and a slide guided therein, a crank-shaft, the said frame being secured thereto, a lever pivoted to the said frame, a locking bolt or pin at one end of said lever, and a projecting nose at the opposite end, a pivot secured to the bicycle-frame at one side of the crank-shaft, cam-shaped bodies capable of swinging around the said pivot mounted eccentrically to the crank-shaft and through the path of the projecting nose of the lever, a bracket attached to the bicycle-frame bearing said pivot, said cam-shaped bodies being adapted when properly adjusted to come in contact with said nose of the locking-lever and automatically release the sliding part of the crank, and means to allow a manual adjustment of the cam-shaped bodies, substantially and for the purpose as specified.

4. The combination with a cycle-wheel, of adjustable cranks for the pedals, each comprising an outer frame and a slide guided therein, a crank-shaft, the said frame being secured thereto, a lever pivoted to the said frame, a locking bolt or pin at one end of said lever, and a nose at the opposite end thereof, a pivot secured to the bicycle-frame at one side of the crank-shaft, cam-shaped bodies capable of swinging around the said pivot mounted eccentrically to the crank-shaft and through the path of the said nose, a bar projecting forward from each cam-shaped body, the forward ends of said bars being bent toward each other, a connecting-rod hinged to said bars, a rod adjacent to the steering-tube, said rod having a handle at its upper end and a crank-arm at its lower end, the connecting-rod being attached to said crank-arm, substantially and for the purpose as specified.

In testimony whereof I affix my signature in presence of two witnesses.

BERNHARD UHLMANN.

Witnesses:
  ERNST DIETZ,
  MAX D. ORDMANN.